United States Patent
Lentz et al.

(10) Patent No.: US 9,721,376 B2
(45) Date of Patent: Aug. 1, 2017

(54) ELIMINATION OF MINIMAL USE THREADS VIA QUAD MERGING

(71) Applicant: Samsung Electronics Co., Ltd., Suwon-si, Gyeonggi-do (KR)

(72) Inventors: Derek J. Lentz, Sun Valley, NV (US); Sang Oak Woo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/671,467

(22) Filed: Mar. 27, 2015

(65) Prior Publication Data

US 2015/0379764 A1 Dec. 31, 2015

Related U.S. Application Data

(60) Provisional application No. 62/018,040, filed on Jun. 27, 2014.

(51) Int. Cl.
G06T 15/00 (2011.01)
G06T 15/80 (2011.01)
G06T 15/40 (2011.01)
G06F 9/44 (2006.01)

(52) U.S. Cl.
CPC .............. G06T 15/005 (2013.01); G06F 9/44 (2013.01); G06T 15/40 (2013.01)

(58) Field of Classification Search
None
See application file for complete search history.

(56) References Cited

U.S. PATENT DOCUMENTS

| | | | |
|---|---|---|---|
| 5,886,701 A | 3/1999 | Chauvin et al. | |
| 6,518,965 B2 | 2/2003 | Dye et al. | |
| 6,633,299 B1 | 10/2003 | Sreenivas et al. | |
| 6,687,396 B1 | 2/2004 | Sugiura et al. | |
| 6,697,063 B1* | 2/2004 | Zhu ...................... | G06T 15/005 345/421 |
| 6,762,765 B2 | 7/2004 | Doyle et al. | |
| 6,831,658 B2 | 12/2004 | Taneja et al. | |
| 6,943,791 B2 | 9/2005 | Pascual et al. | |
| 7,064,771 B1* | 6/2006 | Jouppi .................. | G09G 5/363 345/506 |
| 8,237,738 B1 | 8/2012 | Crow | |
| 8,508,544 B1 | 8/2013 | Molnar et al. | |

(Continued)

FOREIGN PATENT DOCUMENTS

EP 1988508 11/2008

OTHER PUBLICATIONS

Fatahalian et al., "Reducing Shading on GPUs using Quad-Fragment Merging," ACM Transactions on Graphics, vol. 29, No. 4, Article 67, Jul. 2010.

*Primary Examiner* — Tapas Mazumder
(74) *Attorney, Agent, or Firm* — Lewis Roca Rothgerber Christie LLP

(57) ABSTRACT

Fragment merging is performed on a draw call basis. One application is for quad merging. Primitives of the same draw call have many common attributes, such as a graphics state, which facilitates merging of quad fragments. Partially covered quad fragments of the same draw call are considered for possible merging and at least one merge test performed. The merge test may include error tests such as a level of detail error test, interpolated depth, and an interpolation error test.

26 Claims, 6 Drawing Sheets

(56) References Cited

U.S. PATENT DOCUMENTS

| | | | |
|---|---|---|---|
| 8,547,395 B1 | 10/2013 | Hutchins et al. | |
| 2003/0076331 A1* | 4/2003 | Deering | G06T 15/80 345/581 |
| 2005/0046628 A1* | 3/2005 | Hux | G06T 15/005 345/420 |
| 2005/0212806 A1 | 9/2005 | Koselj et al. | |
| 2007/0139440 A1 | 6/2007 | Crow et al. | |
| 2008/0150950 A1* | 6/2008 | Sorgard | G06T 15/005 345/522 |
| 2012/0281004 A1 | 11/2012 | Shebanow et al. | |
| 2014/0063012 A1 | 3/2014 | Madani et al. | |
| 2015/0170410 A1* | 6/2015 | Sathe | G06T 17/20 345/426 |

* cited by examiner

ELIMINATION OF MINIMAL USE THREADS VIA QUAD MERGING

CROSS REFERENCE TO RELATED APPLICATIONS

The present application claims the benefit of Provisional Application No. 62/018,040 filed Jun. 27, 2014, the contents of which are hereby incorporated by reference.

FIELD OF THE INVENTION

The present invention is generally related to pixel shading in a graphics processing system. More particularly, the present invention is directed to performing quad fragment merging to reduce a pixel shading overhead.

BACKGROUND OF THE INVENTION

One aspect of many modern graphics systems that include a graphics processing unit (GPU) is that there are many pixel shader threads that require processing. This consumes power and limits performance. Techniques have been proposed to perform shading using quad-fragment merging. However, conventional approaches have many drawbacks, including various quality problems and artifacts, as well as other problems.

SUMMARY OF THE INVENTION

Fragment merging in a graphics system is performed on a draw call basis. Primitives of the same draw call have many common attributes, such as the same graphics state, which facilitates merging of fragments in blocks of pixels, where the block has a size of at least 2×2 pixels. Partially covered fragments of the same draw call are considered for possible merging and at least one merge test performed. The merge test may include error tests such as a level of detail error test and an interpolation error test.

In one embodiment a method of performing fragment merging in a shading stage of a graphics system on a draw call basis includes performing a draw call and rasterizing primitives. In response to at least one merge test being satisfied, merging is performed of partially covered fragments of a block of pixels to form a merged block of pixels. Shading is performed of the merged block of pixels. In one embodiment the block of pixels is a quad of four pixels, the merge test is a quad merge test, and shading is performed of a merged quad.

In one embodiment a method of performing quad merging in a graphics system includes accumulating data of rasterized primitives for a draw call. A depth of each sample is computed within each primitive of the draw call using depth plane equations or other interpolation techniques such as barycentric computations. Early Z testing is performed for the primitives. Quad merging is performed for the rasterized primitives of the draw call for at least one quad location of partially covered quad fragments satisfying a set of merge tests that excludes overlapping primitives and excludes primitives having different faces.

In one embodiment a graphics processing unit (GPU) includes a fragment merge unit to perform merging of fragments on a draw call basis. In one embodiment the merge unit performs quad merging on a draw call basis. In one embodiment support is provided to accumulate data for groups of primitives or to provide a moving window of primitives and covered blocks (e.g., quads) for accumulating rendered and merged data.

DETAILED DESCRIPTION

Figure 1:
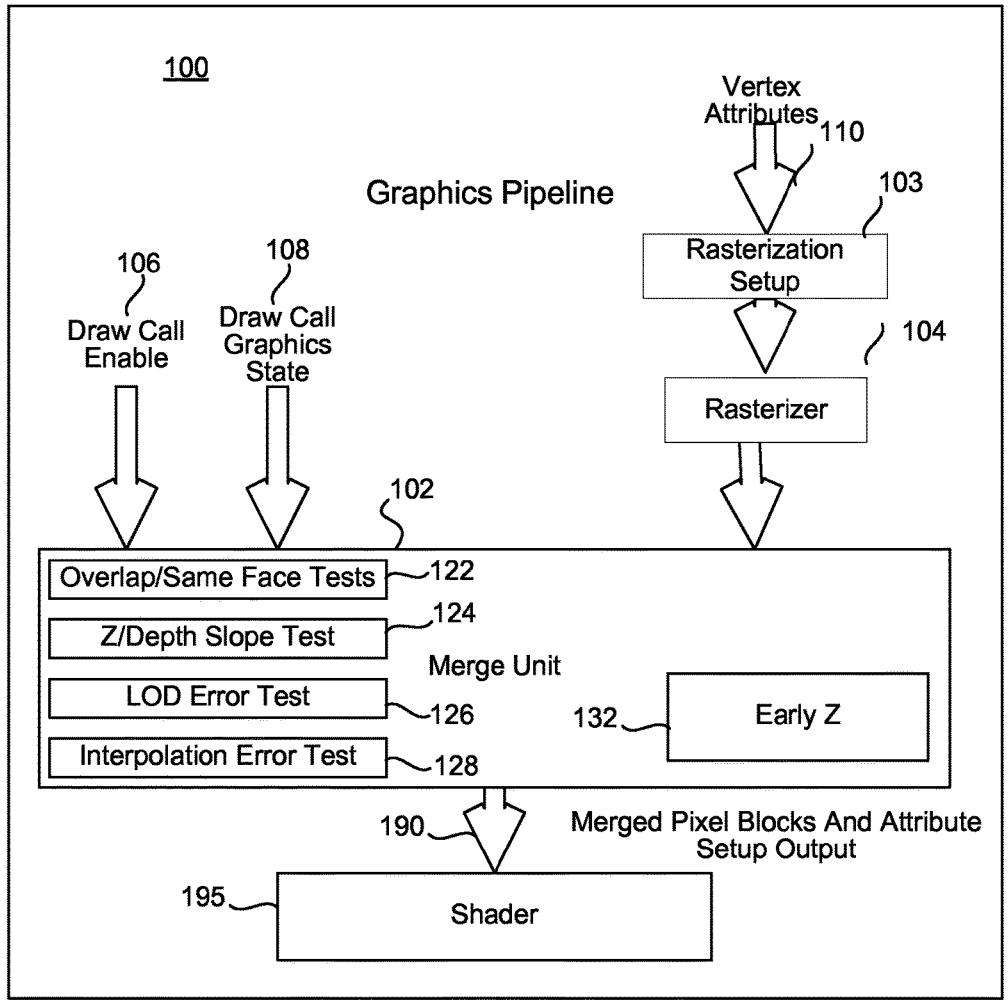
FIG. 1 is a high level block diagram of a merging unit to merge quads for shading in accordance with an embodiment of the present invention.

FIG. 1 is a high level block diagram of a graphics processing unit (GPU) 100 including a merge unit 102 in accordance with an embodiment of the present invention. In one embodiment the merge unit is a merge unit to merge partially covered fragments in pixels blocks at least as large a quad (at least a 2×2 block of pixels). An individual block (e.g., a quad) may be partially covered by two or more different primitives (e.g., typically triangles). Instead of shading the same block multiple times, there is a benefit to merging partially covered blocks that satisfy one or more merge tests to reduce the number of shading threads.

A rasterization setup stage receives vertex attributes. The output of the pre-rasterization setup stage goes into a rasterizer 104. The merge unit 102 receives an output of the rasterizer 104, a draw call enable signal 106, and a graphics state 108 associated with a draw call. The output 190 of the quad merge unit is provided to a shader 195 and includes information on merged blocks. An optional attribute setup output may be included. The merging unit 102 may be implemented in graphics hardware, firmware, or software.

A draw call is a block of rendering primitives in a graphics system that has the same graphics state. Images are generally generated from a set of state changes and draw calls. Within a draw call, the draw call data is accumulated and merge decisions are made. In one embodiment support may be provided to accumulate data for groups of primitives or to provide a moving window of primitives and covered blocks (e.g., quads) for accumulating rendered and merged data.

The graphics state for a draw call will use the same textures and set of attributes, such as the varying variables (hereinafter abbreviates as "Vv") of the OpenGL® graphis language. The merge unit 102 performs merging only within draw calls. In one embodiment the merging may be enabled or disabled on a draw call basis via draw call enable 106 based on application requirements or user requirements.

Software control may be provided to enable or disable merging via the draw call enable 106. In one embodiment the merging may be enabled in a power saving mode or upon the detection of whether or not particular pixel lighting computations could beneficially utilize the merging. For example, specular lighting is a case in which merging may create image artifacts such that it may be desirable to turn merging off for specular lighting. Merging may also be selected based on the primitive or object type to be shaded. As an example, merging should be disabled for sprites and lines.

The merge unit 102 performs one or more merge tests. To support the merge tests for depth related tests, the merge unit 102 may perform or otherwise receive inputs of an early Z compare element 132. In one embodiment attribute setup is performed outside of the merge process and may be delayed until after merging is completed. The merge tests may include testing whether primitives overlap and have a common face 122; a depth slope test 124; which may be indicative of a level of detail (LOD) error 126 by testing objects depth slopes (e.g., in X & Y) and disabling merging when the slope is too great or too different, preventing an LOD problem; and an interpolation error test 128 to prevent merging between primitives that are not adjacent.

Figure 2:
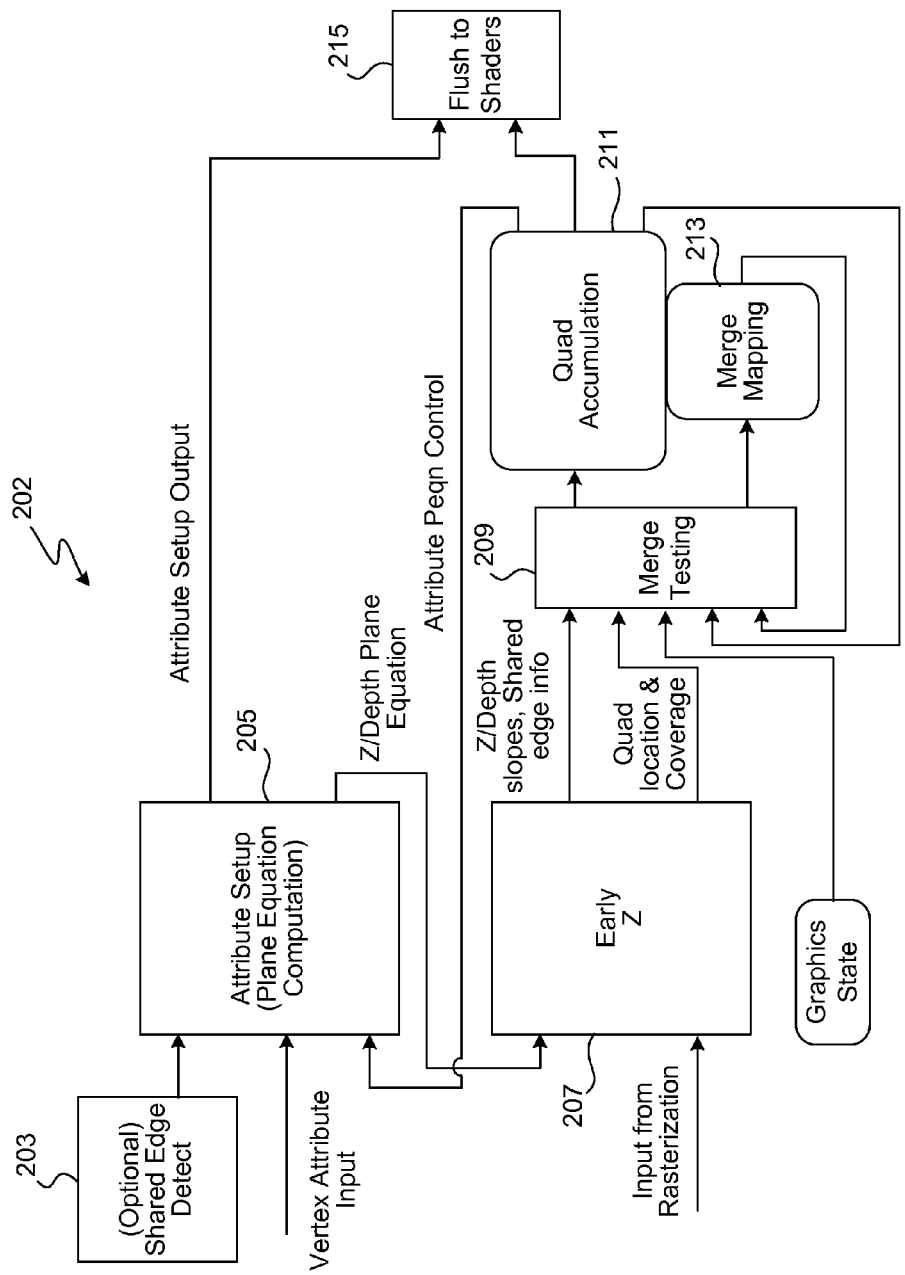
FIG. 2 is a diagram illustrating a quad merging unit in accordance with an embodiment of the present invention.

FIG. 2 shows an example of a quad merge unit 202 in accordance with an embodiment of the present invention. The quad merge unit 202 includes an input from an optional shared edge detection unit 203, an attribute setup unit 205, an early Z unit 207, a merge testing unit 209, a quad accumulation unit 211, a merge mapping unit 213, and a flush to shaders output 215.

In one embodiment the shared edge detection unit 203 detects when edges between primitives are shared and only enables filtering on edges that are exactly shared. For example, the vertex indices within the vertex data array or arrays may be used to identify shared edges between primitives.

In one embodiment, at the start of a draw call, the quad accumulation unit 211 and merge mapping unit storage 213 are empty. The primitives associated with a draw call are rasterized into quads, with live coverage by the rasterizer hardware (not shown in FIG. 2). The attribute setup unit 205 performs interpolation setup (e.g., plane equation computations) to compute the required depth plane equation for each primitive, which in turn permits the depth of each sample within each primitive to be computed. It will be understood, however, that the attribute setup unit could alternatively implement a barycentric interpolation.

Quads that have coverage within primitives are generated by rasterization and passed through to early Z testing in the early Z unit 207. Z/depth values are computed for each sample that the early Z unit tests. Quads with surviving coverage after early Z testing are sent to the merge testing unit 213, which performs the required merge tests. Those quads that pass the merge tests with remaining coverage are stored in the quad accumulation unit storage 211.

In one embodiment mapping information is stored in the merge mapping element storage 213. This mapping information is also used by the merge testing unit 209.

In one embodiment merge testing is applied to each incoming quad with partial coverage, where a quad is partially covered when the quad is not fully covered, but includes at least 1 live sample. When quads are merged, the results are used to modify the quad accumulation unit storage 211 and the merge mapping unit storage 213.

The results of the quad accumulation are flushed to the shaders. As quad merging is performed on a draw call basis, the flushing may be performed before processing a new draw call, such as at the end of a current draw call or at any time when storage has become too full. In one embodiment, when a draw call is complete or if any structure fills up, primitives (e.g., plane equations and primitive face information) and quads are flushed to the shader. In one embodiment, plane equations are flushed in a synchronous manner with quad data so that an interpolator has access to the plane equations when running a pixel shader for the primitives. Data regulation may be provided so that the buffers in the shader and interpolator are not over-filled.

In one embodiment merging is never performed between different draw calls. The primitives of a particular draw call have a common graphics state, which may include common textures, common shader programs, and attribute variables. In many cases the edges within a draw call are edges that are shared between primitives that are internal to a rendered object within the image (non-silhouette) edges. Quads enclosing internal edges are conventionally rendered twice in pixel shaders. However, on average, 50% of the pixels in these types of quads enclosing internal edges are "helper pixels" that are typically only required so that texture hardware can compute a level of detail. Additionally, overlap between primitives within a draw call is often very rare. Performing quad merging for a draw call permits helper pixels to be removed when pixels from the adjacent primitives are packed together in shared quads. Additionally, texture accesses and variables (such as Vv) are shared between adjacent primitives within a draw call. Merging coverage from one quad into another permits shading one quad instead of two quads. Thus if the coverage of non-overlapping primitives at a quad position can be merged, 50% of these pixel shader threads (on edges) are saved (i.e., 1 of 2 quads).

Figure 3:
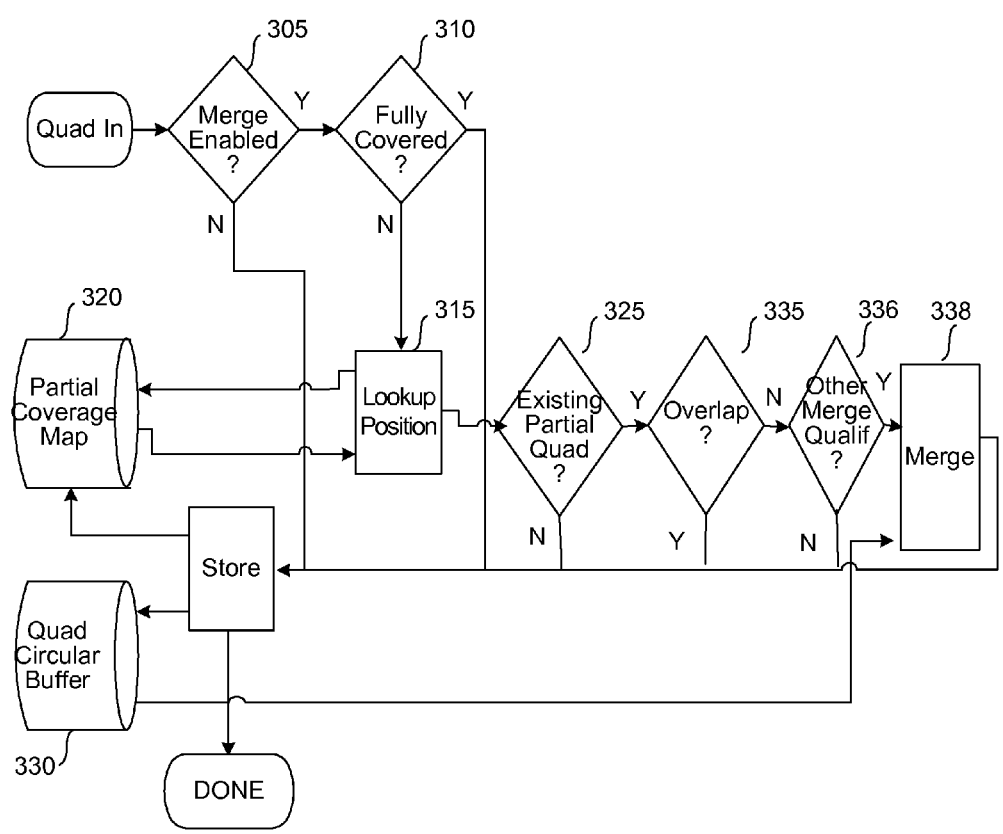
FIG. 3 illustrates a merge testing flow chart in accordance with an embodiment of the present invention.

FIG. 3 is a flowchart illustrating additional aspects of merging. In one embodiment input quads (or larger blocks) are filtered as follows.

A merge enabled test is performed in decision block 305. If merging is disabled, then the process writes data into the quad buffer. No modification is performed of the partial coverage map when merging is disabled.

If merging is enabled, then a test is made in decision block 310 whether the quad is fully covered. If the quad is fully covered, that data is written into the quad buffer. No modification is made of the partial coverage map and no merge is performed.

If merging is enabled and the block is not fully covered then the process moves to the lookup the position block 315. The partial coverage map 320 is read to test if an existing quad is partially covered at this quad position in decision block 325. If an existing quad is not partially covered at this quad position, a write is performed into the quad circular buffer 330 and a write performed to the partial coverage map 320. If an existing quad is partially covered at the quad position, then an overlap test is performed in block 335. In one implementation the test for overlap is (input_coverage & stored_coverage) !=0. An additional further merge qualification test 336 may also be included after the overlap test 335. If there is an overlap and any further merge qualification test passes, then merging 338 is not performed and the data is written into the quad circular buffer 330. In one option the partial coverage map 320 is not modified; in another option the partial coverage map points to the new quad. If there is a different face, merging 338 is not performed and data is written into the quad circular buffer 330 without modifying the partial coverage map 320. In one embodiment other merge tests may also be performed.

If the merging 338 is successful, then a step is performed to overwrite a merged (stored or input) quad buffer entry with combined coverage: (input_coverage|stored_coverage). If the combined coverage is full coverage, then the partial coverage map entry is erased. When coverage is merged, either the stored coverage or the input coverage becomes zero because coverage is migrated from one quad to another.

Options may be provided to merge up to a maximum number of primitives (e.g., 2).

When merging 338 is completed, the buffer data is flushed to the pixel shader(s) along with plane equation data. In one embodiment when a draw call is complete or if any structure fills up, primitives (plane equations) and quads are flushed to the shaders. The plane equations (or equivalent interpolation data) are flushed in a synchronous manner with quad data so an interpolator has access to the plane equations when running the pixel shader(s) for the primitives.

Figure 4:
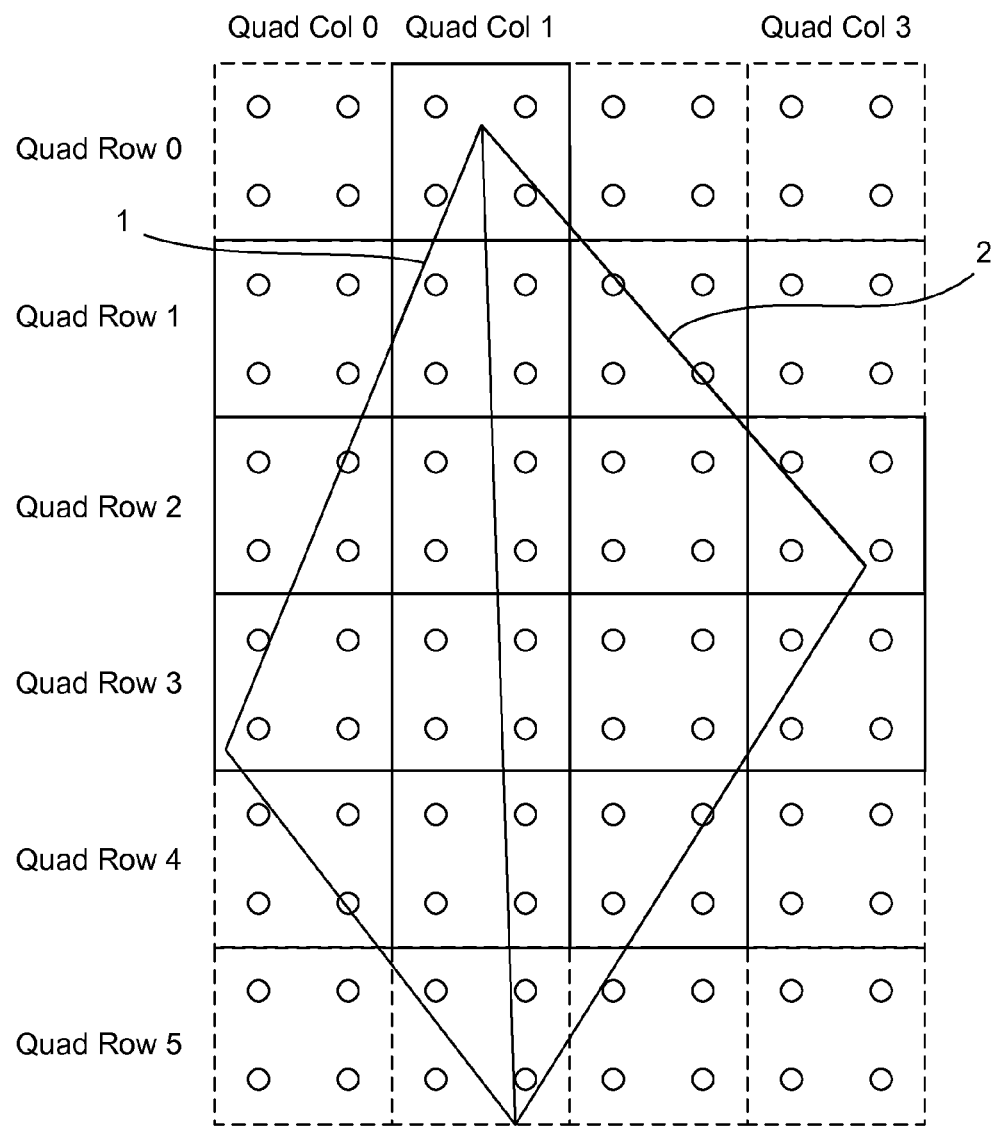
FIG. 4 illustrates aspects of quad merging in accordance with an embodiment of the present invention.

FIG. 4 shows a set of quads and two primitives (triangles 1 and 2) having a shared interior edge. Each quad has four pixel centers. As an illustrative example, the quads in triangle 1 may have a blue color and the quads in triangle 2 a yellow color. In quad (1, 1) (row 1, column 1), the left side pixels from triangle 1 can be merged with the pixels from triangle 2 as in quad (2, 1). In quads (3, 1) and (4, 1) the quads are merged into triangle 1.

Figure 5:
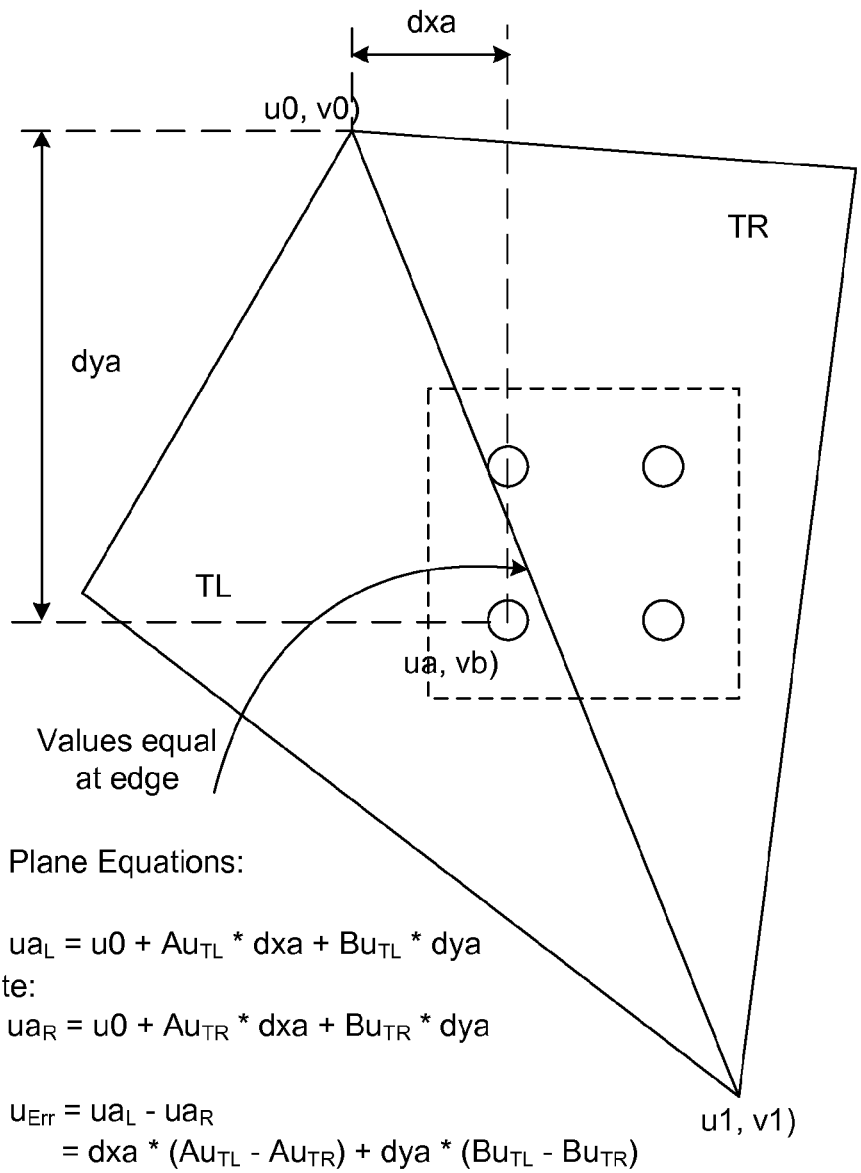
FIG. 5 illustrates aspects of approximation of variable values and interpolation errors in accordance with an embodiment of the present invention.

FIG. 5 illustrates approximation of Vv values for textures. The most common usage for Vv values is to access textures. The Vv values could, in theory, e calculated exactly. However, in practice there are benefits to approximating values by interpolation. The Vv values can be approximated. The approximation error is a function of the Vv slope differences between the 2 primitives and the distance from the edge. If only 1 or 2 pixels are moved to the adjacent triangle, the distance from the edge is normally small (<=sqrt(2)). For this situation, texel differences should be indistinguishable. In a typical application it would generally be the case that only 1 or 2 texels along edge will be affected. The affects should thus be small and basically invisible to an ordinary user. However, there may be significant visible errors if one or both slopes are very large. This normally occurs when the depth slope is large. Large depth slope is inexpensive to test for and may be used to disable merging for a particular primitive. However, if the slopes are close enough then 1 or 2 pixels will have small Vv error and, therefore, the same texels are accessed. An optional implementation detail is to compare the slopes of the Vv directly but this requires a more expensive and complex implementation.

Figure 6:
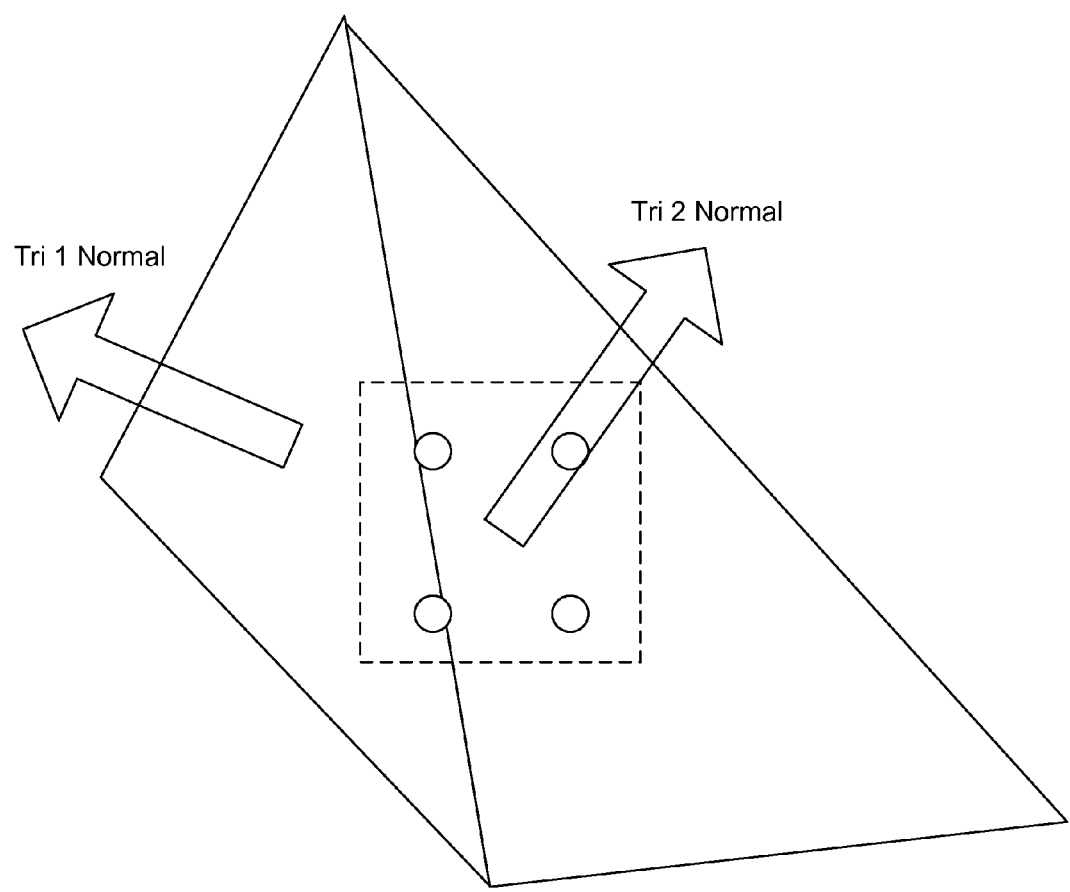
FIG. 6 illustrates aspects associated with specular lighting in accordance with an embodiment of the present invention.

FIG. 6 illustrates issues associated with specular lighting. The primitives each have surface normals. If normal values are significantly different from the correct values at particular pixels, specular highlights can be very different at those pixels because of the power function used in specular lighting. This is because specular lighting uses primitive or pixel level normals. The degree to which artifacts occur for specular lighting depends on various factors. If Phong shading is used, which has per primitive normals, this could result in artifacts from merging. If interpolated normals (per pixel normals) are used, visible artifacts are probably minimal. Similarly, if normal maps (per pixel normals) are used, then there will probably be minimal visible artifacts.

While an exemplary quad fragment merging process has been described, the basic approach works for larger blocks in a primitive as well, as long as the blocks are fully covered. For example, if rasterization creates aligned 4×4 or 8×8 blocks of pixels and they are fully covered, these can be stored more efficiently as larger blocks and this also improves handling.

An exemplary algorithm for disabling merging when the depth slope is too large, resulting in LOD artifacts is now described. The LOD is normally not critical because it is computed using a log function. However, the LOD can change quickly and artifacts can occur when the depth (Z) slope of the primitive is very high. Additionally Vv slopes may change rapidly and approximation errors (Vv approximation) will be larger. Exemplary formulas for disabling merging when the depth slope is high may be based on analyzing the derivatives of depth (Z) with respect to x and y, such as by having the sum of derivatives in each x and y being greater than a threshold or each individual derivative in x and y being greater than a threshold:

$$(dz/dx+dz/dy)>\text{threshold or}$$

$$(dz/dx>\text{threshold})\|(dz/dy)>\text{threshold}$$

An exemplary interpolation error merge test is now described. In one embodiment the slopes of Vv and/or 1/W are used to estimate which quad will have a lower interpolation error. For example, a threshold in the depth slope may be used to define an interpolation error merge test. If the depth (Z) slopes of 2 primitives differ by a lot then the Vv slopes may differ a lot across the edge between them. In one embodiment merging is disabled when the difference between slopes of z in x, and y for two primitives (having z values z1 and z2) is greater than a threshold:

$$(((dz1/dx+dz1/dy)-(dz2/dx+dz2/dy))>\text{threshold})$$

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention. In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

What is claimed is:

1. A method of performing coverage merging in a shading stage of a graphics system, comprising:
performing a draw call on primitives and rasterizing the primitives into quad blocks of four pixels;
selecting the draw call for merge testing of individual quad blocks;
in response to at least one merge test being satisfied, merging partially covered fragments of the same draw call of a block of pixels to form a merged block of pixels; and
performing shading of the merged block of pixels on a draw call basis;
wherein merging is disabled for an individual draw call based on detecting a specular lighting condition.

2. The method of claim 1, wherein, the merge test is a quad merge test, and shading is performed on a merged quad.

3. The method of claim 1, wherein a sequence of draw calls is performed with merging being performed only for blocks of pixels of the same draw call.

4. The method of claim 1, wherein a graphics state of the draw call includes a shared texture access and a set of variables.

5. The method of claim 4, further comprising enabling quad merging based on the graphics state.

6. The method of claim 1, wherein the at least one merge test comprises a depth slope test to disable merging for a Z slope condition indicative of a level of detail error.

7. The method of claim 1 wherein the at least one merge test for partially covered fragments comprises:
performing a test to exclude overlapping fragments; and
performing a test to exclude fragments from different faces.

8. The method of claim 7, further comprising performing a depth slope or depth error test to disable merging for a Z slope condition indicative of a level of detail error.

9. The method of claim 1, further comprising performing interpolation of variables of equations describing primitives and the at least one merge test includes a threshold test of estimated Z interpolation errors.

10. The method of claim 1, wherein the specular lighting condition comprises Phong shading.

11. The method of claim 1, wherein the specular lighting condition comprises a per primitive surface normal.

12. A method of performing quad merging in a graphics system, comprising:
accumulating, for a draw call, data of rasterized primitives;
selecting the draw call for merge testing of individual quad blocks wherein merging is disabled for an individual draw call based on detecting a specular lighting condition;
computing a depth of each sample within each primitive of the draw call using interpolation;
performing early Z testing for the primitives;
performing, for the rasterized primitives of the draw call, quad merging for at least one quad location of partially covered quad coverage satisfying a set of merge tests that excludes overlapping primitives and excludes primitives having different faces; and
performing shading of at least one merged quad of the draw call.

13. The method of claim 12, further comprising performing a depth slope test and disabling merging for a Z slope indicative of a level of detail error.

14. The method of claim 12 further comprising interpolating variables of equations describing primitives and performing a merge test based on estimate of interpolation errors.

15. The method of claim 12, wherein the specular lighting condition comprises Phong shading.

16. The method of claim 12, wherein the specular lighting condition comprises a per primitive surface normal.

17. A graphics system, comprising:
a graphics processing unit (GPU) including a quad merge unit to perform merging on quads that have coverage within primitives,
wherein the quad merge unit merges coverage from one quad into another, and performs merge testing for quads on a selectable draw call basis wherein merging is disabled for an individual draw call based on detecting a specular lighting condition.

18. The graphics system of claim 17, wherein the merge testing includes an overlap test and a different face test.

19. The graphics system of claim 17, wherein the merge testing comprises a depth slope or depth error test to disable merging for a Z slope condition indicative of a level of detail error.

20. The graphics system of claim 17, wherein the merge testing includes an interpolation error test.

21. The graphics system of claim 17, wherein the draw call includes a graphics state.

22. The system of claim 17, wherein the specular lighting condition comprises Phong shading.

23. The system of claim 17, wherein the specular lighting condition comprises a per primitive surface normal.

24. A method of performing coverage merging in a shading stage of a graphics system, comprising:
performing a draw call on primitives and rasterizing the primitives into quad blocks of four pixels;
selecting the draw call for merge testing of individual quad blocks;
in response to at least one merge test being satisfied, merging partially covered fragments of the same draw call of a block of pixels to form a merged block of pixels; and
performing shading of the merged block of pixels on a draw call basis;
wherein merging is disabled for an individual draw call for a sprite or a line.

25. A method of performing quad merging in a graphics system, comprising:
accumulating, for a draw call, data of rasterized primitives;
selecting the draw call for merge testing of individual quad blocks wherein merging is disabled for an individual draw call corresponding to a sprite or a line;
computing a depth of each sample within each primitive of the draw call using interpolation;
performing early Z testing for the primitives;
performing, for the rasterized primitives of the draw call, quad merging for at least one quad location of partially covered quad coverage satisfying a set of merge tests that excludes overlapping primitives and excludes primitives having different faces; and
performing shading of at least one merged quad of the draw call.

26. A graphics system, comprising:
a graphics processing unit (GPU) including a quad merge unit to perform merging on quads that have coverage within primitives,
wherein the quad merge unit merges coverage from one quad into another, and performs merge testing for quads on a selectable draw call basis wherein merging is disabled for an individual draw call for a sprite or a line.

* * * * *